(12) United States Patent
Arata

(10) Patent No.: US 11,920,686 B2
(45) Date of Patent: Mar. 5, 2024

(54) PNEUMATIC TOOL

(71) Applicant: MAKITA CORPORATION, Anjo (JP)

(72) Inventor: Ken Arata, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 17/876,749

(22) Filed: Jul. 29, 2022

(65) Prior Publication Data

US 2023/0088096 A1 Mar. 23, 2023

(30) Foreign Application Priority Data

Sep. 21, 2021 (JP) ................................. 2021-153153

(51) Int. Cl.
*F16K 17/04* (2006.01)
*B25C 1/00* (2006.01)
*B25C 1/04* (2006.01)

(52) U.S. Cl.
CPC .............. *F16K 17/04* (2013.01); *B25C 1/008* (2013.01); *B25C 1/04* (2013.01)

(58) Field of Classification Search
CPC .. F16K 31/1221; F16K 17/04; F16K 31/1226; F16K 17/24; F16K 17/30; F16K 1/46; F16K 1/465
See application file for complete search history.

(56) References Cited

U.S. PATENT DOCUMENTS

| 3,099,432 | A | * | 7/1963 | Zeitlin | ...................... F16K 1/46 251/324 |
| 3,735,777 | A | * | 5/1973 | Katzer | ..................... F16K 17/04 137/516.29 |
| 4,512,359 | A | * | 4/1985 | Hinojosa | ............... F16K 3/0227 251/266 |
| 7,523,944 | B2 | * | 4/2009 | Hatori | .................... F16J 15/441 277/460 |
| 2006/0055120 | A1 | * | 3/2006 | Umetsu | ...................... F16J 9/14 277/459 |
| 2017/0357276 | A1 | * | 12/2017 | Sprengel | ................. F16K 1/465 |
| 2022/0260158 | A1 | * | 8/2022 | Gregoire | .................. F16J 15/48 |

FOREIGN PATENT DOCUMENTS

FR 2244948 * 9/1973
JP 2007-237374 A 9/2007

* cited by examiner

*Primary Examiner* — Jessica Cahill
(74) *Attorney, Agent, or Firm* — Oliff PLC

(57) ABSTRACT

A driving tool includes a chamber to store compressed air and a relief valve in communication with the chamber. The relief valve includes an inflow channel communicating with the chamber and an outflow channel with a larger diameter formed at a downstream side of the inflow channel. A valve stem moves along the inflow channel. An O-ring to seal the inflow channel is attached in an annular groove of the valve stem. Air release channels are defined in the valve stem. Each air release channel includes an inlet that opens to an inner circumferential chamber and an outlet that opens to the outflow channel to allow the compressed air to be discharged from the inner circumferential chamber to the outflow channel when the O-ring moves toward the outflow channel and moves beyond the inflow channel due to the internal pressure of the chamber.

14 Claims, 9 Drawing Sheets

PNEUMATIC TOOL

CROSS-REFERENCE TO RELATED APPLICATIONS

This application claims priority to Japanese patent application serial number 2021-153153 filed Sep. 21, 2021, the content of which is incorporated herein by reference in its entirety for all purposes.

BACKGROUND

The present invention relates to pneumatic tools.

Pneumatic tools are configured to operate utilizing compressed air. For instance, the compressed air is supplied to a pneumatic tool from an air supply source (air compressor). The pneumatic tool may be, for example, a driving tool which is powered by compressed air to drive fasteners, such as nails, screws, and/or staples, into a counter material. The driving tool includes a chamber to store compressed air, a piston that moves up and down by the compressed air, and an air motor that gains rotational power by the compressed air. A driver bit is driven down by the piston while the driver bit is rotated by the air motor. This allows the driver bit to drive a screw into a counter material.

Conventionally, a relief valve, which is configured to open a chamber to the atmosphere when an internal pressure has reached an abnormal level, is provided in a chamber of such a pneumatic tool. The relief valve may have, for example, an O-ring attached to a valve stem to seal a flow channel passing over the valve stem and communicating the chamber with external air.

A relief valve normally returns to its original state when the pressure within a chamber returns to normal after the chamber has been opened to the atmosphere. However, if the pressure within the chamber was extremely high, the O-ring would likely have come off of a valve stem during the opening operation. Therefore, in order to reuse the relief valve, it was necessary to re-fit the O-ring to the valve stem. Namely, the restoration of the relieve valve is necessary. In view of this background, it has long been desired to provide a relief valve having an O-ring that will not easily come off of a valve stem.

SUMMARY

According to one aspect of the present disclosure, a pneumatic tool includes a chamber to store compressed air, and a relief valve to be provided within a chamber. The relief valve includes an inflow channel communicating with the chamber, and an outflow channel formed at a downstream side of the inflow channel. The outflow channel has a diameter greater than that of the inflow channel. A valve stem moves along the inflow channel. An O-ring, which is configured to seal the inflow channel, is attached in an annular groove at an outer circumference of the valve stem. An air release channel is defined in the valve stem. The air release channel includes an inlet open to an inner circumferential chamber and an outlet open to the outflow channel, thereby allowing the compressed air to be discharged from the inner circumferential chamber to the outflow channel when the compressed air has entered the inner circumferential chamber between a wall surface of the annular groove and an inner circumferential surface of the O-ring. This may occur when the O-ring is on its way to the outflow channel beyond the inflow channel due to the internal pressure of the chamber.

Once the O-ring that has reached the outflow channel, it may expand in diameter and the compressed air entering the inner circumferential chamber may promote further expansion of the inner diameter of the O-ring. However, at the same time, the compressed air is discharged from the inner circumferential chamber, through the air release channels, and to the outflow channel. This may prevent the O-ring from excessively expanding in diameter and from coming off from the valve stem. As a result, the restoration process of re-fitting the O-ring to the valve stem to is no longer necessary to reuse the relief valve.

DETAILED DESCRIPTION

Figure 1:
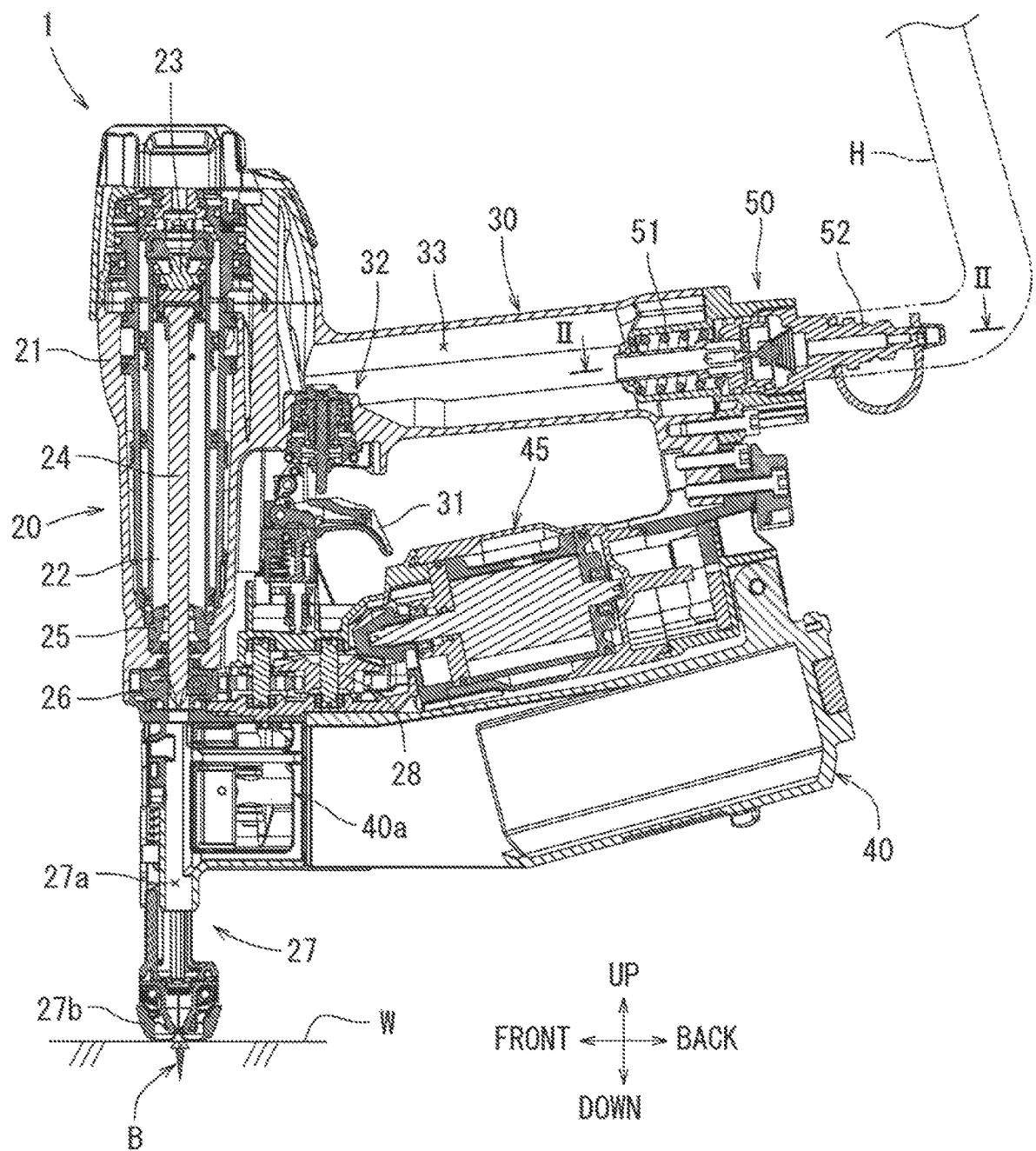
FIG. 1 is a cross-sectional view of a driving tool.

According to an aspect of the present disclosure, an air release channel may be configured as a groove formed on a downstream wall surface of wall surfaces of an annular groove. The downstream wall surface is configured to support an O-ring from a downstream side of a flow of the compressed air. The groove extends in a radial direction of a valve stem. Therefore, the air release channel can be produced relatively easily, as compared with a structure in which, for example, has a through hole formed in the valve stem so as to allow an inner circumferential chamber to communicate with an outflow channel via the through hole.

According to an aspect of the present disclosure, a plurality of grooves may be formed on the downstream wall surface of the annular groove. Therefore, the compressed air entering into the internal peripheral chamber can be discharged more quickly to the outflow channel, as compared to a structure in which only a single groove is formed. An expansion of the diameter of the O-ring may thus be more effectively prevented.

According to an aspect of the present disclosure, the pneumatic tool includes a grip that is configured to be grasped by a user and accommodates a chamber. The relief valve is provided at an axial end face of the grip. Therefore, the compressed air discharged from the relief valve is oriented in an axial direction of the grip. The compressed air is thus less likely to blow against an operator, even when the compressed air is being discharged from the relief valve.

According to an aspect of the present disclosure, the pneumatic tool includes a pressure regulator valve configured to reduce the pressure of the compressed air from outside. The pressure regulator is also configured to supply the compressed air to the chamber. The pneumatic tool includes a driving tool body equipped with a driver that utilizes the compressed air from the chamber to drive fasteners. Therefore, the compressed air from the outside is reduced in pressure to an appropriate pressure to operate the driver by the pressure regulator valve.

According to an aspect of the present disclosure, the pneumatic tool includes a chamber to store the compressed air, and a relief valve provided in the chamber. The relief valve includes an inflow channel to allow communication with the chamber, and an outflow channel that is formed on the downstream side of the inflow channel and has a diameter greater than that of the inflow channel. A valve stem moves along the inflow channel. An O-ring to seal the inflow channel is attached in an annular groove at an outer circumference of the valve stem. An O-ring come-off prevention structure is provided to prevent the O-ring from being removed from the valve stem as the O-ring expands in a radial direction. The O-ring's diameter may expand when the O-ring is on its way to the outflow channel beyond the inflow channel due to the higher internal pressure in the chamber.

Therefore, the O-ring come-off prevention structure prevents the O-ring from excessively expanding in the radial direction and from being removed from the valve stem. As a result, a restoration process is no longer necessary to re-fit the O-ring to the valve stem in order to reuse the relief valve.

As shown in FIG. 1, a driving tool 1 may be a hand-held screw fastening tool, referred to as a so-called screw driving machine. The driving tool 1 includes a tool body 20 having a striking mechanism inside, a grip 30 structured to be grasped by an operator, and a magazine 40 capable of accommodating a plurality of screws, and an air motor 45.

As shown in FIG. 1, the tool body 20 includes a cylindrical body housing 21. A striking mechanism, which has a cylinder 22 and a piston 23, is installed in the body housing 21. A long rod-shaped driver bit 24 is coupled to a lower side of the piston 23. The driver bit 24 extends further downward. The driver bit 24 protrudes from the cylinder 22 via an inner circumferential side of a downward motion end damper 25. The downward motion end damper 25 is arranged at a lower portion of the cylinder 22.

As shown in FIG. 1, a driving nose 27 is provided at a lower portion of the tool body 20. The driving nose 27 extends further downward. The driver bit 24 is inserted into an interior of the driving nose 27 (e.g., through a driving channel 27a).

As shown in FIG. 1, the grip 30 extends laterally from a side of the tool body 20. A chamber 33 for accumulating compressed air is provided within the grip 30. A starting valve 32 is provided on a lower side of a base portion of the grip 30. A trigger 31 is provided on a side of the tool body 20 and below the starting valve 32.

As shown in FIG. 1, the trigger 31 is configured to be pulled upward by a fingertip of a hand grasping the grip 30. The pulling operation of the trigger 31 causes the starting valve 32 to turn ON. As the starting valve 32 is turned ON, the compressed air is supplied from the chamber 33 into the tool body 20. The supplied compressed air causes the piston 23 to move downward in the cylinder 22. The driver bit 24 moves downward within the driving channel 27a as the piston 23 moves downward.

As shown in FIG. 1, screws B are supplied one by one from a magazine 40 into the driving channel 27a. A connected screw band with a plurality of screws B connected, for example, with a resin connecting band is loaded in the magazine 40 in a wound state. The magazine 40 is connected to the driving nose 27 via a screw feeding mechanism 40a. The screws B are supplied by the screw feeding mechanism 40a to the driving channel 27a. This is done in conjunction with a driving operation. One screw B fed into the driving channel 27a is pushed down by the driver bit 24.

As shown in FIG. 1, an annular bit rotating portion 26 is interposed between the tool body 20 and the driving nose 27. The bit rotating portion 26 is provided so as to be rotatable about an axis of the driver bit 24. The driver bit 24 is constantly positioned within an inner circumferential side of the bit rotating portion 26. The bit rotating portion 26 serves to rotate the driver bit 24 about a bit axis (which may extend in a bit fastening direction) while allowing the driver bit 24 to reciprocally move up and down.

As shown in FIG. 1, the bit rotating portion 26 is rotated in the bit fastening direction by an air motor 45. A multi-stage gear train 28 is interposed between the bit rotating portion 26 and the air motor 45. The gear train 28 transmits the rotational power of the air motor 45 to the bit rotating portion 26. This leads to the bit rotating portion 26 rotating about the axis of the driver bit 24. Rotating the bit rotating portion 26 causes the driver bit 24, which is inserted into the inner circumferential side, to integrally rotate in the screw fastening direction.

As shown in FIG. 1, the driver bit 24 is rotated by the bit rotating portion 26 in the bit fastening direction while the driver bit 24 moves downward in the driving channel 27a. The driver bit 24 moves downward in the driving channel 27a in response to the downward movement of the piston 23. As a result, one screw B is pressed down against a workpiece W and is rotated to be fastened.

As shown in FIG. 1, a contact arm 27b is disposed below the driving nose 27 and is configured to be relatively displaceable up and down. The contact arm 27b moves upward relative to the driving nose 27 when the driving tool 1 is pushed down while the contact arm 27b is in contact with a fastening section of the workpiece W. The driving operation of the tool body 20 can be made to be performed upon the condition that both an ON operation caused by moving the contact arm 27b upward and a pulling operation caused by pulling the trigger are performed. This combination of operations may avoid inadvertent driving operations.

As shown in FIG. 1, a cap 50, which is configured to hermetically seal the chamber 33, is attached to a back end of the grip 30. A connecting coupler 52, which is configured to connect an air hose H, is provided to the cap 50. The connecting coupler 52 is connected to the chamber 33 via the pressure regulator valve 51. The pressure regulator valve 51 supplies the compressed air to the chamber 33 at an appropriate pressure.

Figure 2:
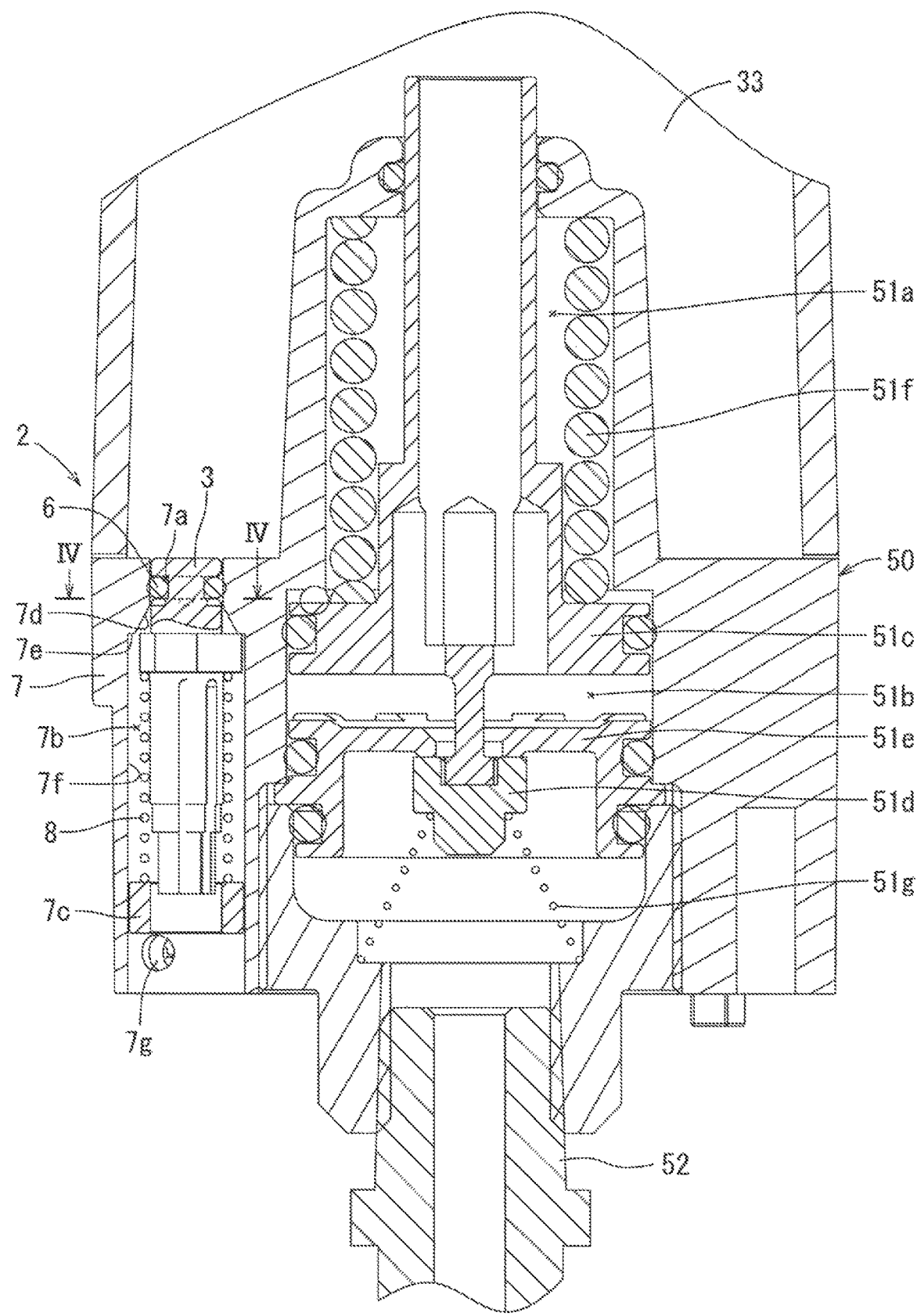
FIG. 2 is a cross-sectional view taken along a line II-II of FIG. 1.

As shown in FIG. 2, the pressure regulator valve 51 includes a small diameter tubular portion 51a and an intermediate tubular portion 51b. A valve stem 51c, a valve body 51d, a valve seat 51e, a first spring 51f, and a second spring 51g are provided in a channel defined within the small diameter tubular portion 51a and the intermediate tubular portion 51b. The valve body 51d moves to the valve seat 51e, in a direction against a biasing force of the first spring 51f, due to the compressed air supplied from the connecting coupler 52 to the pressure regulator valve 51. Therefore, the compressed air is reduced in pressure by utilizing the first spring 51f and is then supplied into the chamber 33.

As shown in FIG. 2, the cap 50 is provided with a single relief valve 2 adjacent to the pressure regulator valve 51. The relief valve 2 opens the chamber 33 to the atmosphere to maintain the pressure within the chamber 33 at an appropriate pressure.

As shown in FIG. 2, the relief valve 2 includes a valve casing 7, in which a channel is defined to communicate with the chamber 33. A valve stem 3 movable along the flow channel and a compression spring 8 to bias the valve stem 3 toward a closing side are provided in the valve casing 7. An O-ring 6 is provided on an outer circumferential surface of the valve stem 3.

As shown in FIG. 2, the valve casing 7 includes an inflow channel 7a and an outflow channel 7b as a flow channel. The inflow channel 7a is configured to communicate with the chamber 33. The outflow channel 7b is configured to communicate with a downstream side of the inflow channel 7a. The inflow channel 7a linearly extends from one side of the cap 50 and has a diameter smaller than the cylindrical inner circumferential surface 7f of the outflow channel 7b, the outflow channel 7b having a circular cross-section. The outflow channel 7b includes a tapered surface 7d on an upstream side, the tapered surface 7d having a diameter gradually increasing from upstream to downstream. An upstream section of the tapered surface 7d leads to an inner wall of the inflow channel 7a. The outflow channel 7b includes the cylindrical inner circumferential surface 7f. The cylindrical inner circumferential surface 7f may be positioned on a downstream side of the tapered surface 7d and may have a larger diameter than the inflow channel 7a. Since the diameter of the cylindrical inner circumferential surface 7f is larger than the diameter of the downstream section of the tapered surface 7d, a stepped portion may be formed between the tapered surface 7d and the cylindrical inner circumferential surface 7f. The stepped portion constitutes a contact surface 7e configured to restrict excessive upstream movement of a stopper portion 3d of the valve stem 3. A spring pedestal 7c, which may be for supporting the compression spring 8, is provided on a downstream section of the cylindrical inner circumferential surface 7f. The inflow channel 7a and the outflow channel 7b are arranged substantially on a straight line.

Figure 3:
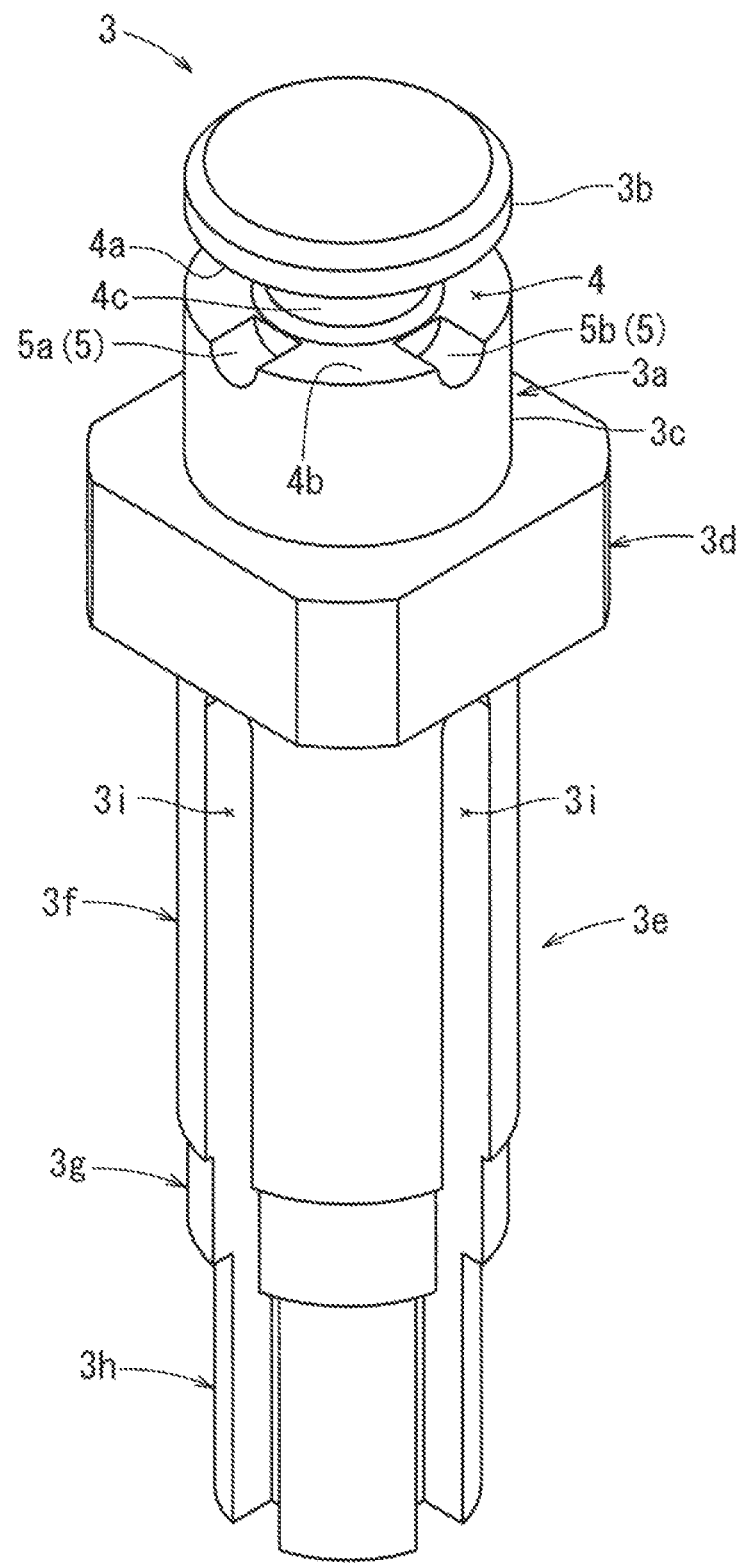
FIG. 3 is a perspective view of a valve stem.

As shown in FIG. 3, the valve stem 3 includes a slide portion 3a, a stopper portion 3d, and a leg portion 3e, arranged in this order from upstream to downstream. The slide portion 3a has a substantially columnar shape with an annular groove 4 formed on an outer circumferential surface where the O-ring 6, shown in FIG. 2, is configured to be attached. The slide portion 3a includes a head portion 3b on an upstream side of the annular groove 4. A downstream side of the head portion 3b constitutes an upstream wall surface 4a of the annular groove 4. The slide portion 3a includes a slide body portion 3c on the downstream side of the annular groove 4. An upstream side of the slide body portion 3c constitutes a downstream wall surface 4b of the annular groove 4. A fillet is provided between the upstream wall surface 4a and a bottom surface 4c, as well as between the downstream wall surface 4b and the bottom surface 4c. The annular groove 4 includes the bottom surface 4c, and the depth of the annular groove 4 is shallower than the diameter of the O-ring 6.

Figure 4:
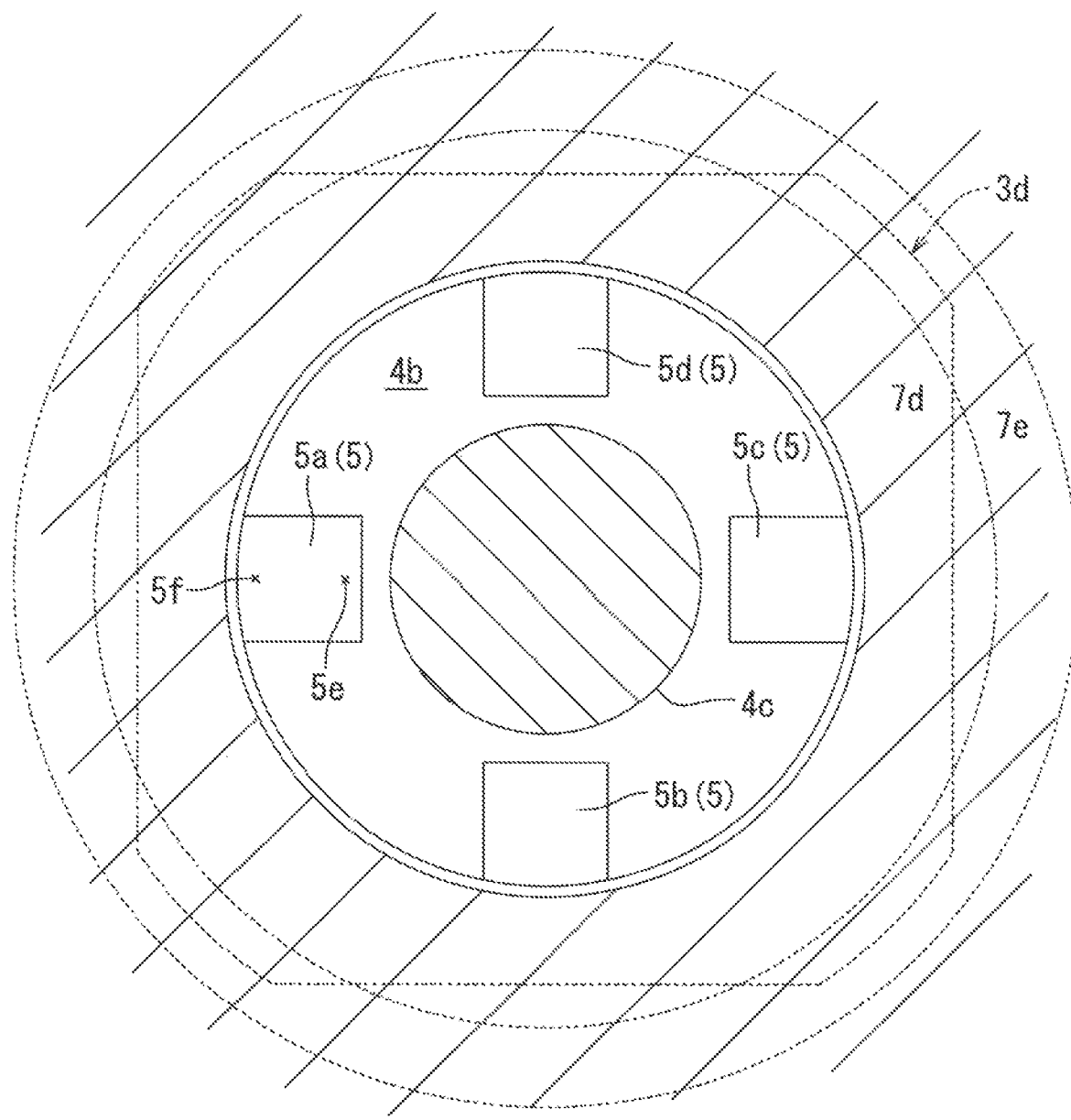
FIG. 4 is a cross-sectional view taken along a line IV-IV of FIG. 2.

As shown in FIG. 3 and FIG. 4, air release grooves 5 are formed on the downstream wall surface 4b. A plurality of, for example, four release grooves 5 may be formed on the downstream wall surface 4b. The plurality of air release grooves 5 may be arranged at substantially equal intervals in a circumferential direction. Each of the air release grooves 5 includes an inlet 5e in the vicinity of the bottom surface 4c of the annular groove 4. The inlet 5e may extend in the radial direction. The inlet 5e may be located, for example, in the vicinity of a terminal end location of the fillet, which may be located between the bottom surface 4c and the downstream wall surface 4b. Each of the air release grooves 5 includes an outlet 5f on an outer side of the groove 5 in the radial direction. The outlet 5f is located on the outer circumferential side from the center of the partially orthogonal cross-section of the O-ring 6, and is open to the inflow channel 7a (or outflow channel 7b). An end of the outlet 5f opens to the outer circumferential surface of the slide portion 3a. The width of the air release groove 5 may be, for example, about half of the wire diameter of the O-ring 6. The depth of the air release groove 5 may be or shallower than, for example, half of the diameter of the O-ring 6.

As shown in FIG. 3 and FIG. 4, the stopper portion 3d has substantially a rectangular parallelepiped shape. Four corners of the stopper portion 3d are chamfered to have a generally curved surface. The four corners of the stopper portion 3d are each sized to correspond to the contact surface 7e, and are configured to interfere with the contact surface 7e in order to restrict the excessive movement of the valve stem 3 to the upstream side. An end of the compression spring 8 comes in contact with a downstream surface of the stopper portion 3d.

As shown in FIG. 2 and FIG. 3, a leg portion 3e has substantially a hollow cylindrical shape and includes a main body portion 3f, a middle portion 3g, and an end portion 3h, in this order from upstream to downstream. The diameters of the main body portion 3f, the middle portion 3g, and the end portion 3h are successively reduced. The end portion 3h positioned to be is constantly inserted in a through hole of the pedestal 7c. This prevents the end of the leg portion 3e from moving significantly. The diameter of the middle portion 3g is greater than the diameter of the through hole of the pedestal 7c. Therefore, the middle portion 3g may come in contact with an upper surface of the pedestal 7c as the valve stem 3 moves to the downstream side. The valve stem 3 is thus configured to primarily stay at the downstream side from its resting position. A plurality of, for example, four slots 3i may be formed in the leg portion 3e extend over substantially the entire axial length. This allows the leg portion 3e to be elastically reduced in diameter. The compression spring 8 is attached to or placed around an outer circumference of the leg portion 3e.

As shown in FIG. 2, the compression spring 8 is a coil spring. A first end on the upstream side of the compression spring 8 comes in contact with a downstream surface of the stopper portion 3d. A second end on the downstream side of the compression spring 8 comes in contact with an upstream side of the pedestal 7c. The pedestal 7c is fixed in the vicinity of an outlet of the outflow channel 7b. More specifically, a pin hole 7g is formed in the vicinity of the outlet of the outflow channel 7b. A spring pin (not shown) is fitted in the pin hole 7g to fix the spring pin to the pedestal 7c.

As shown in FIG. 2, the O-ring 6 may have an annular shape, and may be made of, for example, rubber. The O-ring 6 is a circular ring and may be elastically expanded in diameter. The inner diameter of the O-ring 6, in its natural state, is smaller than the diameter of a bottom surface 4c of the annular groove 4, which is located at the slide portion 3a. The outer diameter of the O-ring 6 is larger than the outer diameter of the slide portion 3a (for example the head portion 3b and the slide body portion 3c). Therefore, the O-ring 6 may be configured such that the inner circumferential surface 6a of the O-ring 6, when fitted in the annular groove 4, comes in contact with the bottom surface 4c of the annular groove 4, and the outer circumferential surface 6b projects from the annular groove 4. This allows the O-ring 6 to seal the inflow channel 7a by acting together with the valve stem 3 when the valve stem 3 is in its initial position.

When the internal pressure within the chamber 33 is below a predetermined level, the relief valve 2 brings the O-ring 6 into the inflow channel 7a so as to closely contact the inner wall of the inflow channel 7a and the valve stem 3 as illustrated by a virtual line in FIG. 5, thereby sealing the inflow channel 7a. At this time, the O-ring 6 is elastically deformed by being pressed by the inner wall of the inflow channel 7a. As a result, the O-ring 6 elastically deforms toward the bottom surface 4c of the annular groove 4. This results in an expansion of the area where the O-ring 6 comes in contact with the bottom surface 4c of the annular groove 4. In addition, the pushing force pushing the O-ring 6 against the bottom surface 4c of the annular groove 4 increases. When the internal pressure within the chamber 33 exceeds the predetermined level, the valve stem 3 moves toward the downstream side and against the biasing force of the compression spring 8.

Figure 5:
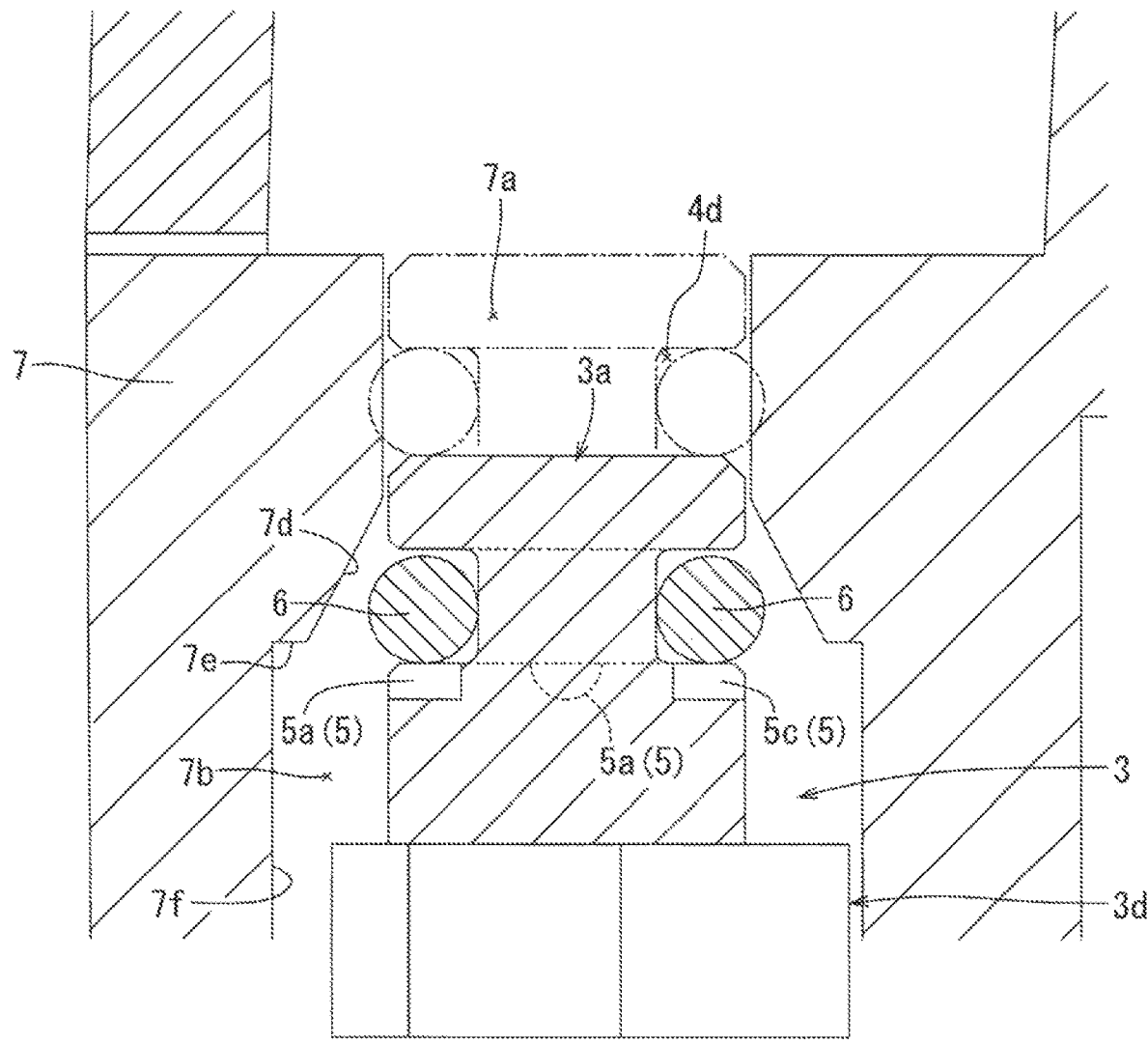
FIG. 5 is a view illustrating a state where a relief valve is operated to unseal an O-ring.
Figure 6:
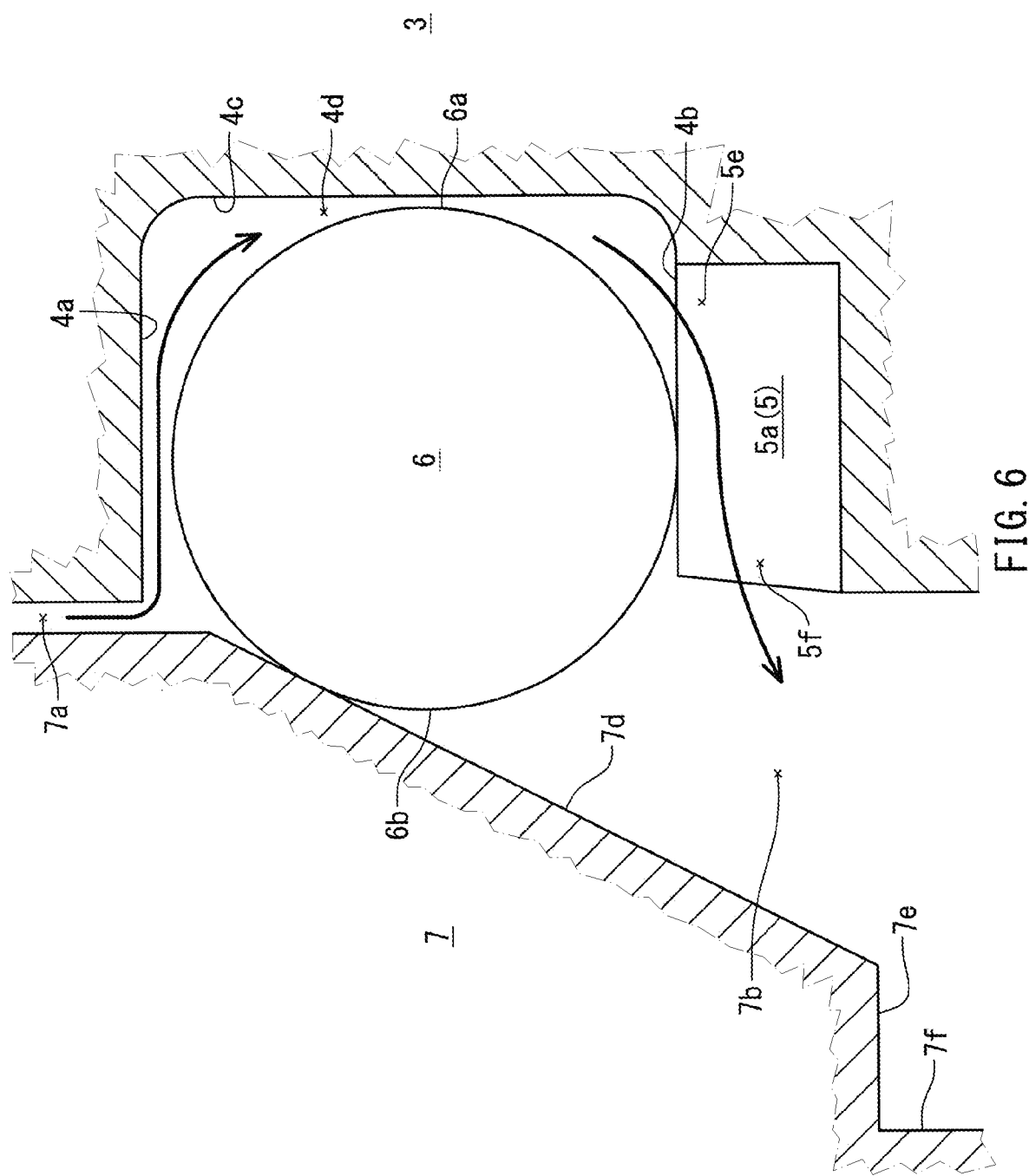
FIG. 6 is a view illustrating an action due to air release grooves.

As shown in FIG. 5 and FIG. 6, the O-ring 6 moves to the downstream side together with the valve stem 3. The O-ring 6 may move beyond the inflow channel 7a and reach the tapered surface 7d. Since the pushing force pushing the O-ring 6 inward in the radial direction will be weaker when the O-ring 6 is in contact with the tapered surface 7d, as compared with contacting the inner wall of the inflow channel 7a, the O-ring attempts to return to its natural state due to the elastic force of the O-ring 6 itself. That is, the outer circumferential surface 6b of the O-ring 6 increases in diameter. As the O-ring 6 moves toward the downstream side, the O-ring 6 is pushed to the downstream side by the internal pressure within the inflow channel 7a. Therefore, the downstream side of the O-ring 6 is pushed against the downstream wall surface 4b of the annular groove 4. On the other hand, the upstream side of the O-ring 6 moves away from the upstream wall surface 4a of the annular groove 4. In some embodiments, at least the upstream side of the O-ring 6 is distanced apart from the upstream wall surface 4a of the annular groove 4 when the O-ring 6 has reached the tapered surface 7d.

As shown in FIG. 5 and FIG. 6, the outer circumferential surface 6b of the O-ring 6 may come in contact with a portion of the tapered surface 7d. Therefore, the compressed air within the inflow channel 7a may pass between the upstream side of the O-ring 6 and the upstream wall surface 4a of the annular groove 4, and may then enter an area at the inner circumferential surface 6a side of the O-ring 6. The compressed air may then push the inner circumferential surface 6a of the O-ring 6 outward in the radial direction, thereby causing the diameter of the inner circumferential surface 6a of the O-ring 6 to increase. This allows the inner circumferential surface 6a of the O-ring 6 to leave the bottom surface 4c of the annular groove 4. As a result, the compressed air may then pass between the inner circumferential surface 6a of the O-ring 6 and the bottom surface 4c of the annular groove 4 and flow to the downstream side of the O-ring 6. More specifically, the compressed air may flow into the inner circumferential chamber 4d, which is an area that is partially surrounded by the bottom surface 4c of the annular groove 4, the downstream wall surface 4b, and the inner circumferential surface 6a of the O-ring 6. The compressed air then attempts to further expand the inner diameter of the O-ring 6. In some embodiments, the air release groove 5 is defined in the valve stem 3.

Figure 8:
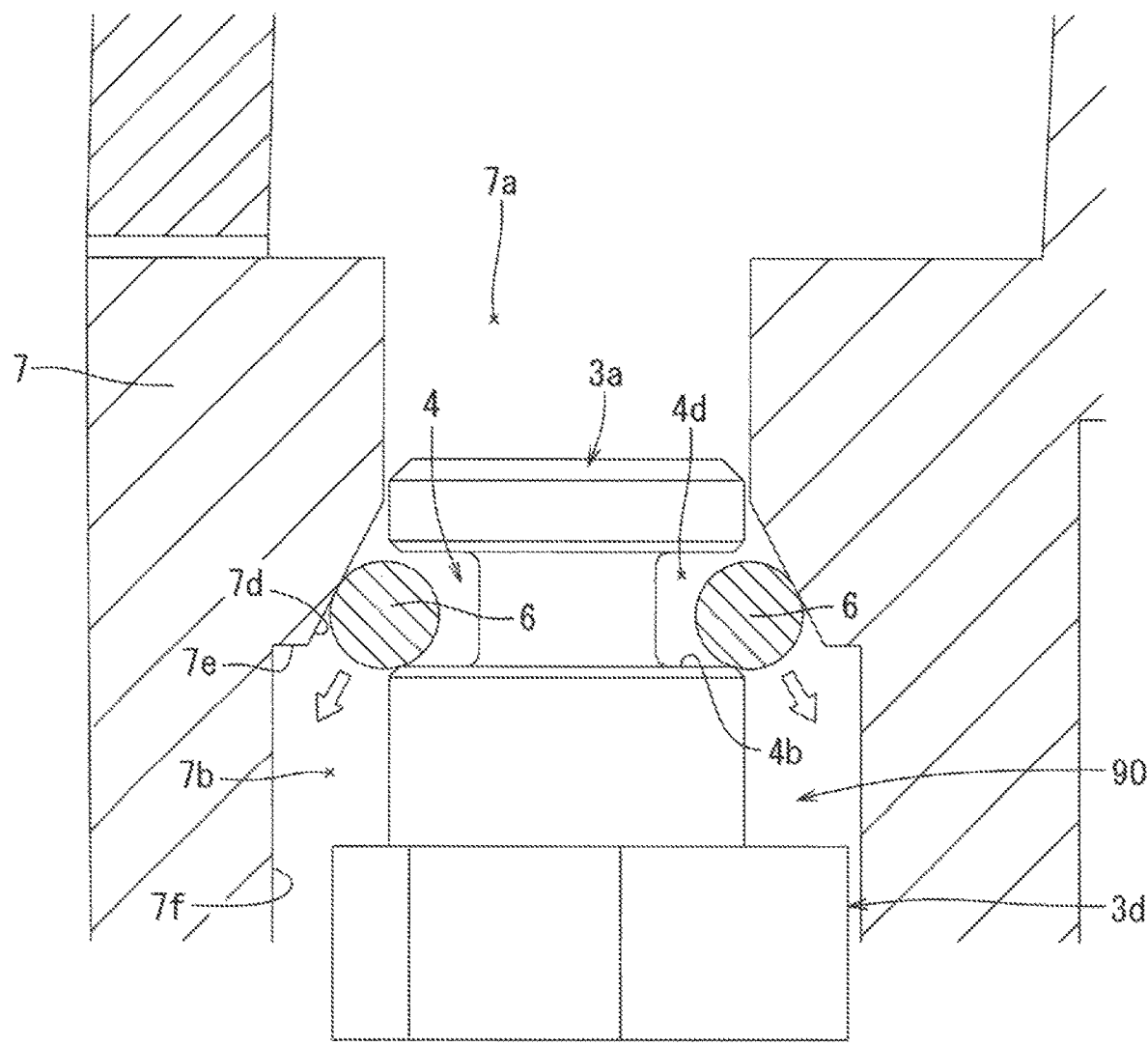
FIG. 8 is a view illustrating a state where the diameter of the O-ring is expanded in the relief valve due to the absence of air release grooves.
Figure 9:
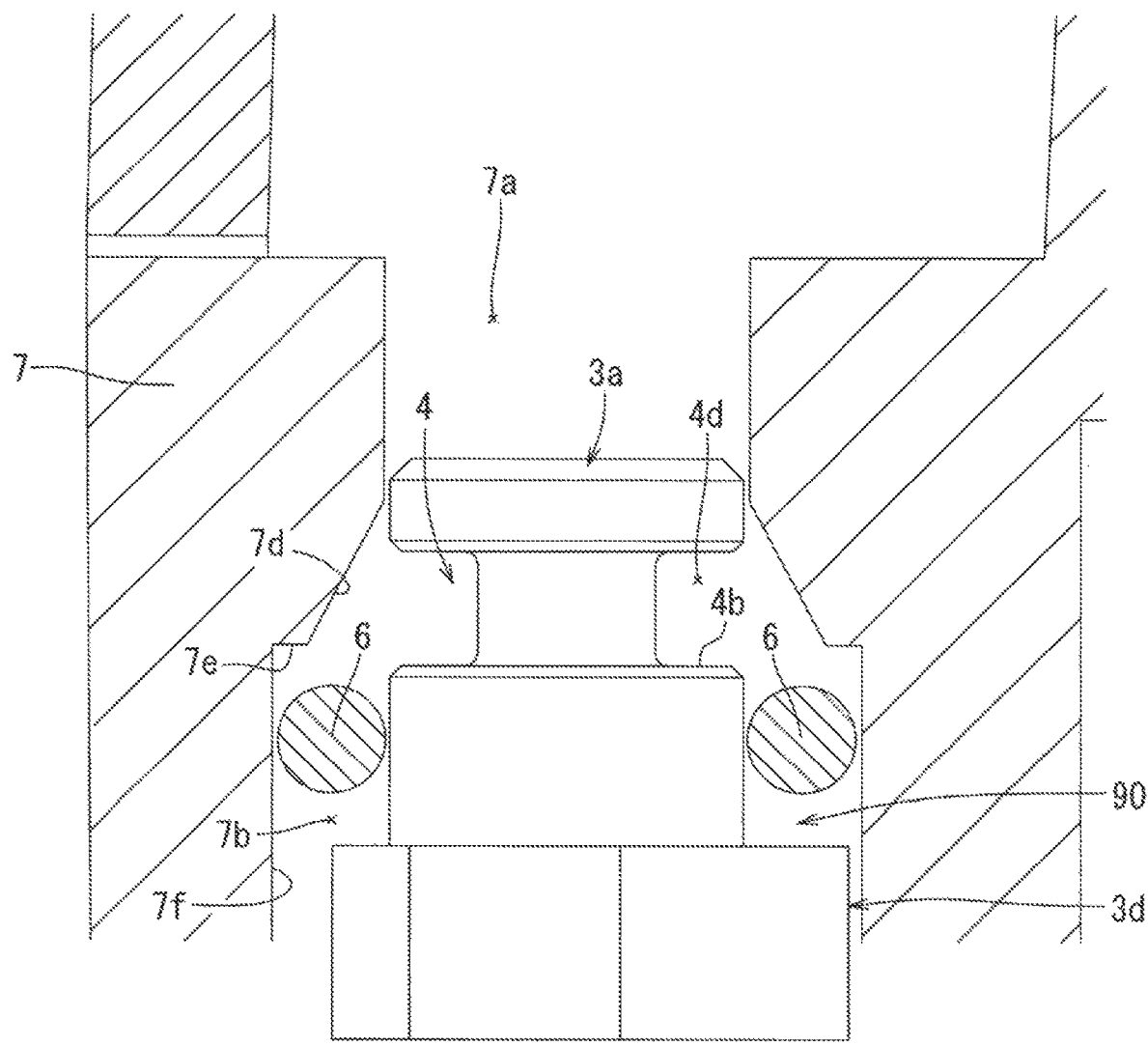
FIG. 9 is a view illustrating a state where the O-ring came off from the valve stem in the relief valve of FIG. 8.

For reference, a relief valve 90 without an air release groove will be described with reference to FIG. 8 and FIG. 9. If there is no air release groove, the compressed air that has entered the inner circumferential chamber 4d cannot easily escape anywhere. This causes the compressed air within the inner circumferential chamber 4d to push the inner circumferential surface 6a of the O-ring. This causes the O-ring 6 to further expand in diameter, sometimes excessively. The compressed air is discharged to the outflow channel 7b when the O-ring 6 moves away from the tapered surface 7d and/or from the downstream wall surface 4b of the annular groove 4, so that the expansion of the diameter of the O-ring 6 will not further proceed. However, if the expansion of the diameter of the O-ring 6 proceeds when the O-ring 6 does not move away from the tapered surface 7d and/or the downstream wall surface 4b of the annular groove 4b, the O-ring 6 may be axially displaced with respect to the annular groove 4, for instance as shown in FIG. 9. In such a case, an operator will need to re-fit the O-ring 6 to the valve stem 3, thereby interrupting the operation during that time.

On the other hand, the air release groove 5 of the above embodiment allows the compressed air that has entered the inner circumferential chamber 4d to be discharged to the outflow channel 7b, for instance as shown in FIG. 6. Therefore, the O-ring 6 is prevented from being excessively expanded in diameter as its inner circumferential surface 6a is pushed by the compressed air. Meanwhile, the valve stem 3 may still move further toward the downstream side and reaches the position indicated, for instance, by a solid line in FIG. 5. The valve stem 3 being is such a position allows the inflow channel 7a to communicate with the outflow channel 7b at the outer side of the O-ring 6 in the radial direction, thereby opening the chamber 33 to the atmosphere. This prevents the O-ring 6 from exiting the annular groove 4 in the axial direction.

As described-above, a driving tool 1 may include a chamber 33 to store compressed air and a relief valve 2 provided in the chamber 33, an embodiment of which is shown in FIG. 1 and FIG. 2. The relief valve 2 may include an inflow channel 7a communicating the chamber 33 with an outflow channel 7b, the outflow channel 7b being formed at the downstream side of the inflow channel 7a and having a larger diameter than the inflow channel 7a. As shown in FIG. 5, the valve stem 3 may move along the inflow channel 7a. An O-ring 6 to seal the inflow channel 7a may be fitted in an annular groove 4 formed at the outer circumference of the valve stem 3. An air release channel or channels (e.g., air release grooves 5a to 5d) may be formed in the valve stem 3. Each air release channel may include an inlet 5e open to an inner circumferential chamber 4d and an outlet 5f open to the outflow channel 7b, the air release channel or channels being configured to allow the compressed air to be discharged from the inner circumferential chamber 4d to the outflow channel 7b when the compressed air enters a portion of the inner circumferential chamber 4d between a wall surface of the annular groove 4 and an inner circumferential surface 6a of the O-ring 6 when the O-ring 6 is moving toward the outflow channel 7b beyond the inflow channel 7a due to the internal pressure of the chamber 33.

Therefore, the diameter of the O-ring 6 may expand as the O-ring 6 moves with the valve stem 3 and as the O-ring 6 reaches the outflow channel 7b. The further expansion of the diameter of the O-ring 6 may be promoted due to the compressed air that has entered the inner circumferential chamber 4d. However, at the same time, the compressed air is able to be discharged from the inner circumferential chamber 4d to the outflow channel 7b by passing through the air release channel or channels. This prevents the O-ring 6 from being removed from the valve stem 3 due to excessive expansion of its diameter. As a result, it is no longer necessary to re-fit the O-ring 6 to the valve stem 3 in order to reuse the relief valve 2.

As shown in FIG. 4, the air release channel or channels may be defined by grooves (e.g., air release groove 5a) formed on the downstream wall surface 4b of one of the wall surfaces 4a, 4b of the annular groove 4 that supports the O-ring 6 from the downstream side of the direction in which the compressed air is configured to flow. The groove or grooves extend in the radial direction of the valve stem 3. Therefore, the air release channel or channels may be obtained relatively easily as compared to the case, for example, where the inner circumferential chamber 4d and the outflow channel 7b are in communication with each other via through holes formed in the valve stem 3.

As shown in FIG. 4, a plurality of grooves (for example, 4 air release grooves 5a to 5d) are formed in the downstream wall surface 4b of the annular groove 4. Therefore, the compressed air that has entered the inner circumferential chamber 4d may be more quickly discharged into the outflow channel 7b, as compared to the case where a single groove is formed. This may efficiently prevent the expansion in diameter of the O-ring 6.

As shown in FIG. 1, the driving tool 1 may include a grip 30 that is configured to be grasped by a user and to accommodate a chamber 33. The relief valve 2 may be provided at an axial end face of the grip 30. Therefore, the compressed air discharged from the relief valve 2 may be oriented in the axial direction of the grip 30. The compressed air is thus less likely to blow against an operator when the compressed air is discharged from the relief valve 2.

As shown in FIG. 1, the driving tool 1 may include a pressure regulator valve 51 configured to reduce the pressure of the compressed air from the outside and to supply the compressed air into the chamber 33. The driving tool 1 may be a pneumatic tool that includes a driving tool body 20 equipped with a driver (e.g., a driver bit 24) that utilizes the compressed air from the chamber 33 to drive fasteners (e.g., screws B). Therefore, the compressed air from the outside is reduced in pressure to an appropriate pressure to operate the driver by the pressure regulator valve 51.

As shown in FIG. 1 and FIG. 2, an O-ring 6, which may be used to seal the inflow channel 7a, may be attached in an annular groove 4 at an outer circumference of the valve stem 3. An O-ring come-off prevention structure (e.g., air release grooves 5a to 5d) is provided to prevent the O-ring 6 from being removed from the valve stem 3 as the O-ring 6 is expanded in a radial direction as the O-ring 6 moves toward the outflow channel 7b, which is beyond the inflow channel 7a, due to the internal pressure of the chamber 33.

Therefore, the O-ring 6 is prevented from excessively expanding in the radial direction and from being removed from the valve stem 3 due to the O-ring come-off prevention structure. As a result, a restoration process is no longer necessary to re-fit the O-ring 6 to the valve stem 3 in order to reuse the relief valve 2.

A second embodiment will be described with reference to FIG. 7. The second embodiment is formed in much the same way as the first embodiment described above. The driving tool 1 according to the second embodiment includes a valve stem 70 shown in FIG. 7, instead of the valve stem 3 shown in FIG. 6.

Figure 7:
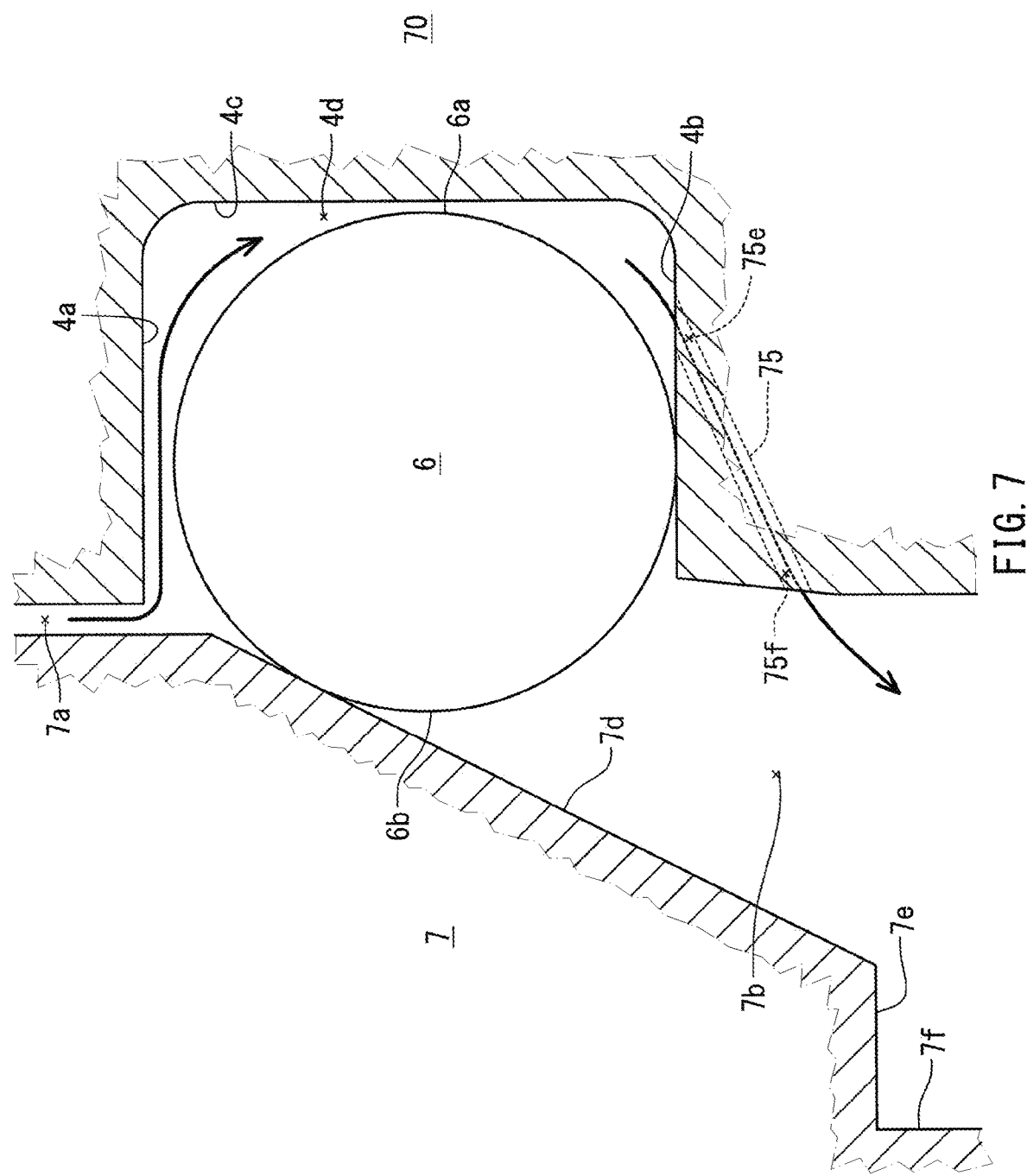
FIG. 7 is a partial cross-sectional view of the relief valve according to another embodiment.

As shown in FIG. 7, an air release hole or holes 75 may be formed through the downstream wall surface 4b of the valve stem 70. The air release hole or holes 75 may be, for example, a drilled hole extending from the downstream wall surface 4b to an outer circumferential surface of the slide body 3c. An inlet 75e of the air release hole 75 may be located in the vicinity of the bottom surface 4c of the annular groove 4. The inlet 75e thus opens to the inner circumferential chamber 4d on an inner circumferential side of the center of a partially orthogonal cross-section of the O-ring 6. The inlet 75e may be, for example, located in the vicinity of the terminal end location of a fillet, which may be located between the bottom surface 4c and the downstream wall surface 4b. The outlet 75f of the air release hole 75 may be formed to allow the outer circumferential surface of the slide body 3c to have an opening. The outlet 75f thereby opens to the flow channels 7a, 7b on the outer circumferential side of the center of the partially orthogonal cross-section of the O-ring 6.

Alternative to the above-described embodiments, other embodiments, some of which will be described, below may also be adopted. For instance, the air release hole 75 may be formed in any shape, as long as it communicates the inner circumferential chamber 4d to the flow channels 7a and 7b. For example, the air release hole 75 may have an orthogonal cross-section having, for example, an elliptical shape or polygonal shape. In order to increase an escaping amount and/or rate of compressed air, multiple, for example, four, air release holes 75 may be formed through the downstream wall surface 4b.

As shown in FIG. 1, the driving tool 1 is configured to drive a screw B utilizing compressed air and is additionally configured to allow the screw B to rotate so as to be fastened to the workpiece W. Alternatively, for example, an air nail driver may be adopted. In other words, the driving tool 1 may be any pneumatic tool having a relief valve in a chamber, such as, for example, an air impact driver, air hammer, or air wrench.

As shown in FIG. 6, the air release groove 5 is open at the end of the outlet 5f, which is located at the outer circumferential surface of the slide portion 3a. Alternatively, it is also possible that the end of the outlet 5f may open at another position, such as at the downstream wall surface 4b. In other words, the air release groove 5 only needs to open to the flow channels 7a, 7b. For instance, it may open such that the compressed air can flow toward the outer circumferential side of the center of the partially orthogonal cross-section of the O-ring 6. It is also possible that the air release groove 5 extends in the radial direction from the inlet 5e beyond the center, such that the end of the outlet 5f opens at the downstream wall surface 4b.

As shown in FIG. 4, the air release groove 5 includes four air release grooves 5a to 5d. Alternatively, it is also possible to have only a single air release groove 5a or more than one air release groove 5a. Further, one or more grooves may be formed in addition to the four air release grooves 5a to 5d, so as to have five or more air release grooves 5.

As shown in FIG. 2, the driving tool 1 includes a chamber 33 provided with a pressure regulator valve 51 and with the relief valve 2. Alternatively, the chamber 33 may be provided with only the relief valve 2. That is, the compressed air may be supplied into the chamber 33 directly from the outside air supply source. The relief valve 2 operates when the pressure in the chamber 33 has reached an abnormal level, for example, due to a failure of the air supply source.

As shown in FIG. 3, the air release groove 5 may be formed in the wall surface 4b of the annular groove 4 of the valve stem 3. Alternatively, the air release groove 5 may be formed in another position, such as through the tapered surface 7d of the outflow channel 7b of the valve casing 7. If the air release groove 5 is formed through the tapered surface 7d, the valve stem 3 may not have the inner circumferential chamber 4d. This may result in the O-ring 6 being prevented from expanding in diameter as it being pushed by the compressed air. For example, the air release groove 5 may be positioned to extend from the upstream section of the tapered surface 7d downward to the downstream section. In this configuration, the inlet 5e opens to the inner flow channel 7a, while the outlet 5f opens at or near the contact surface 7e. The air release groove 5 in this position may also serve as an O-ring come-off prevention structure.

The various examples described in detail above, with reference to the attached drawings, are intended to be representative of the present disclosure, and are thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, so as to provide an improved pneumatic tool, and/or methods of making and using the same.

What is claimed is:

1. A pneumatic tool, comprising:
    a chamber configured to store compressed air; and
    a relief valve in fluid communication with the chamber, wherein:
    the relief valve includes:
    an airflow channel that includes, in seriatim, from an inlet of the airflow channel to an outlet of the airflow channel:
        an inflow channel (i) in communication with the chamber and (ii) having a first constant cross section;
        a tapered section that (i) begins at an outlet of the inflow channel and (ii) has a cross-section that gradually increases from the outlet of the inflow channel to an outlet of the tapered section; and
        an outflow channel that (i) begins at the outlet of the tapered section and (ii) has a second constant cross section that is larger than the first constant cross section;
    a valve stem (i) configured to slide along the inflow channel and the tapered section, (ii) having an annular groove in an outer circumference of a slide portion of the valve stem that is configured to slide along the inflow channel and the tapered section and (iii) having an air release channel; and
    an O-ring (i) in the annular groove and (ii) being configured to seal the inflow channel when the slide portion is in the inflow channel;
    the O-ring and the airflow channel are configured such that the O-ring is in a compressed state when the O-ring is in the inflow channel and in an uncompressed state when the O-ring is in the tapered section;
    wherein the air release channel includes an inlet that is open to an inner circumferential chamber of the annular groove and an outlet that is open to the outflow channel when the slide portion is in the tapered section; and
    the air release channel is configured to allow at least a portion of the compressed air in the inner circumferential chamber and flowing between a wall surface of the annular groove and an inner circumferential surface of the O-ring to be discharged from the inner circumferential chamber to the outflow channel due to (i) movement of the O-ring from the inflow channel to the tapered surface and (ii) change of the O-ring from the compressed state to the uncompressed state due to an internal pressure of the chamber.

2. The pneumatic tool according to claim 1, wherein:
    the air release channel is a groove in a downstream wall surface of the annular groove;
    the downstream wall surface is configured to support the O-ring from a downstream side; and
    the groove extends in a radial direction of the valve stem.

3. The pneumatic tool according to claim 2, wherein a second groove is in the downstream wall surface of the annular groove and is configured to be a second air release channel.

4. The pneumatic tool according to claim 1, further comprising a grip configured to be grasped by a user, wherein:
    the chamber is in the grip; and
    the relief valve is at an end face of the grip.

5. The pneumatic tool according to claim 1, further comprising:
    a pressure regulator valve configured to reduce the pressure of air from outside the chamber and to supply the air into the chamber; and
    a driving tool body equipped with a driver that utilizes the compressed air from the chamber to drive a fastener.

6. A pneumatic tool, comprising:
    a chamber configured to store compressed air; and
    a relief valve in fluid communication with the chamber, wherein:
    the relief valve comprises:
    an airflow channel that includes, in seriatim, from an inlet of the airflow channel to an outlet of the airflow channel:
        an inflow channel in communication with the chamber;
        a tapered section that (i) begins at an outlet of the inflow chamber and (ii) has a cross section that gradually increases from the outlet of the inflow channel to an outlet of the tapered section; and
        an outflow channel that (i) begins at the outlet of the tapered section and (ii) has a cross-sectional area greater than a cross-sectional area of the inflow channel;
    a valve stem (i) configured to slide along the inflow channel and the tapered section and (ii) having an annular groove in an outer circumference of a slide portion of the valve stem that is configured to slide along the inflow channel and the tapered section; and
    an O-ring (i) in the annular groove and (ii) configured to seal the inflow channel when the slide portion is in the inflow channel;
    the airflow channel, the O-ring and the valve stem are configured to prevent the O-ring from being displaced from the annular groove of the valve stem as the O-ring is expanded in a radial direction, when the O-ring is moving from the inflow channel to the tapered section, due to an internal pressure of the chamber.

7. A pneumatic tool, comprising:
    a chamber configured to store compressed air; and
    a relief valve in fluid communication with the chamber, wherein:
    the relief valve comprises:
    an airflow channel that includes, in seriatim, from an inlet of the airflow channel to an outlet of the airflow channel:
        an inflow channel in communication with the chamber;
        a tapered section that (i) begins at an outlet of the inflow chamber and (ii) has a cross section that gradually increases from the outlet of the inflow channel to an outlet of the tapered section; and
        an outflow channel that (i) begins at the outlet of the tapered section and (ii) has a cross-sectional area greater than a cross-sectional area of the inflow channel;

a valve stem (i) configured to slide along the inflow channel and the tapered section and (ii) having an annular groove in an outer circumference of a slide portion of the valve stem that is configured to slide along the inflow channel and the tapered section; and an O-ring (i) in the annular groove and (ii) configured to seal the inflow channel when the slide portion is in the inflow channel;

the airflow channel, the O-ring and the valve stem are configured to reduce the pressure between an inner circumference of the O-ring and the annular groove to be below or to prevent the pressure between the inner circumference of the O-ring and the annular groove from becoming greater than a resilience force of the O-ring when the inner diameter of the O-ring is equal to the outer circumference of the valve stem.

8. The pneumatic tool according to claim 7, wherein the airflow channel, the O-ring and the valve stem are configured to increase a flow of the compressed air between the inner circumference of the O-ring and the annular groove as the O-ring moves into the tapered section.

9. The pneumatic tool according to claim 7, further including an air release channel that is configured to allow the air to flow through the air release channel as the O-ring moves through the tapered section.

10. The pneumatic tool according to claim 9, wherein the airflow channel, the O-ring and the valve stem are configured such that the compressed air is prevented from flowing through the air release channel before the O-ring moves into the tapered section.

11. The pneumatic tool according to claim 9, wherein the air release channel is in a wall surface of the annular groove.

12. The pneumatic tool according to claim 11, wherein the air release channel is a groove.

13. The pneumatic tool according to claim 9, wherein the air release channel is in a wall surface of the outflow channel.

14. The pneumatic tool according to claim 9, wherein the air release channel extends from an intersection between the inflow channel and the tapered section.

\* \* \* \* \*